United States Patent
Tubilla Kuri

(10) Patent No.: US 9,558,472 B1
(45) Date of Patent: Jan. 31, 2017

(54) INVENTORY FACILITY

(71) Applicant: Amazon Technologies, Inc., Seattle, WA (US)

(72) Inventor: Fernando Tubilla Kuri, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/966,774

(22) Filed: Dec. 11, 2015

(51) Int. Cl.
*G06Q 10/08* (2012.01)
*B66C 1/66* (2006.01)
*G05B 19/04* (2006.01)
*G05B 19/19* (2006.01)

(52) U.S. Cl.
CPC ............. *G06Q 10/087* (2013.01); *B66C 1/663* (2013.01); *G05B 19/041* (2013.01); *G05B 19/19* (2013.01); *G05B 2219/2621* (2013.01); *G05B 2219/39102* (2013.01)

(58) Field of Classification Search
CPC .................................. B66C 1/66; B66C 1/663
See application file for complete search history.

(56) References Cited

U.S. PATENT DOCUMENTS

| | | | | |
|---|---|---|---|---|
| 3,712,661 A | * | 1/1973 | Strand | B66C 1/663 294/81.53 |
| 4,509,635 A | * | 4/1985 | Emsley | B07C 3/082 198/370.03 |
| 4,541,662 A | * | 9/1985 | Berg | B66C 1/663 294/82.1 |
| 5,472,503 A | * | 12/1995 | Birchler | B65G 49/0459 118/423 |
| 7,331,471 B1 | * | 2/2008 | Shakes | B07C 7/005 209/559 |
| 9,135,403 B1 | * | 9/2015 | Tolmosoff | G06F 19/3462 |
| 9,386,865 B2 | * | 7/2016 | Bally | A47F 3/14 |
| 2015/0178673 A1 | * | 6/2015 | Penneman | B65G 1/0492 104/18 |

* cited by examiner

Primary Examiner — Thomas Randazzo
(74) Attorney, Agent, or Firm — Lee & Hayes, PLLC

(57) ABSTRACT

This application describes fabric storage totes, as well as techniques for use of fabric totes in an infrastructure that uses mechanical systems to transport the fabric totes and/or access inventory items in the fabric totes. The fabric totes may include a fabric base and side walls, with a hardened material support structure. Additionally, the fabric totes may include two handles made of a substantially hard material. The fabric totes may be accessed and transported, manually and/or mechanically, via interaction with the handles.

20 Claims, 10 Drawing Sheets

INVENTORY FACILITY

This application is related to U.S. patent application Ser. No. 14/966,711, filed on Dec. 11, 2015, entitled "Storage Totes," the entire contents of which are incorporated herein by reference.

BACKGROUND

Modern inventory systems, such as those used in mail order warehouses, supply chain distribution centers, airport luggage systems, and custom-order manufacturing facilities, face significant challenges in responding to requests for inventory items. As inventory systems grow, the challenges of simultaneously completing large numbers of packing, storing, and other inventory-related tasks become non-trivial.

Increasingly, mobile order fulfillment systems are used within inventory facilities to address these and other concerns. A mobile order fulfillment system may provide automation for delivering hard plastic storage containers to central workstations for workers to select and pack the ordered items in preparation for shipping. However, in inventory systems tasked with a significant number of inventory requests, the inefficient use of storage space with the hard plastic storage containers can result in lower throughput and overall decreased system performance. Additionally, the inefficient use of storage space can result in increased capital expenses, as a larger building would be required to store an equivalent amount of inventory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This application describes, in part, fabric containers to hold inventory ("fabric totes"), as well as techniques for use in an infrastructure that uses mechanical systems to transport the fabric totes and/or access inventory in the fabric totes. In various examples, the fabric totes may include a fabric base and side walls, and two handles made of a substantially hard material. The fabric base and side walls may include an internal and/or external support structure, such as a hard material plate in the base and/or in the side walls. In some examples, the handles of the fabric totes may be configured to slide on rails for storage and/or transportation.

In some examples, the fabric totes may be stored on rails in inventory pods. In such examples, the infrastructure may include robotic arms (e.g., mechanical arms) that are configured to partially and/or fully remove the fabric tote from the inventory pod. With the fabric tote partially and/or fully removed, a robotic arm may extract one or more items from the fabric tote. The robotic arm configured to extract the items may be the same or a different robotic arm than the robotic arm configured to remove the fabric tote from the inventory pod.

In various examples, the infrastructure may include a mobile order fulfillment system in which mobile drive units (e.g., mechanical devices), which in some instances may be robotic drive units, may be dispatched and instructed to deliver one or more fabric totes to a work station via an inventory pod. In such examples, the fabric totes may be removed at the work station manually and/or via a robotic arm.

Additionally or alternatively, the infrastructure may include a conveyor system for transporting fabric totes. In some examples, the conveyor system may comprise two rails or cables, on which the handles of the fabric tote may travel.

The fabric totes, as described herein, may be used in an inventory facility (e.g., a warehouse, a depot, distribution center, etc.), in a retail environment (e.g., a store, a brick and mortar store, a shopping mall, a marketplace, etc.), or other environment in which items must be stored and moved.

Figure 1:
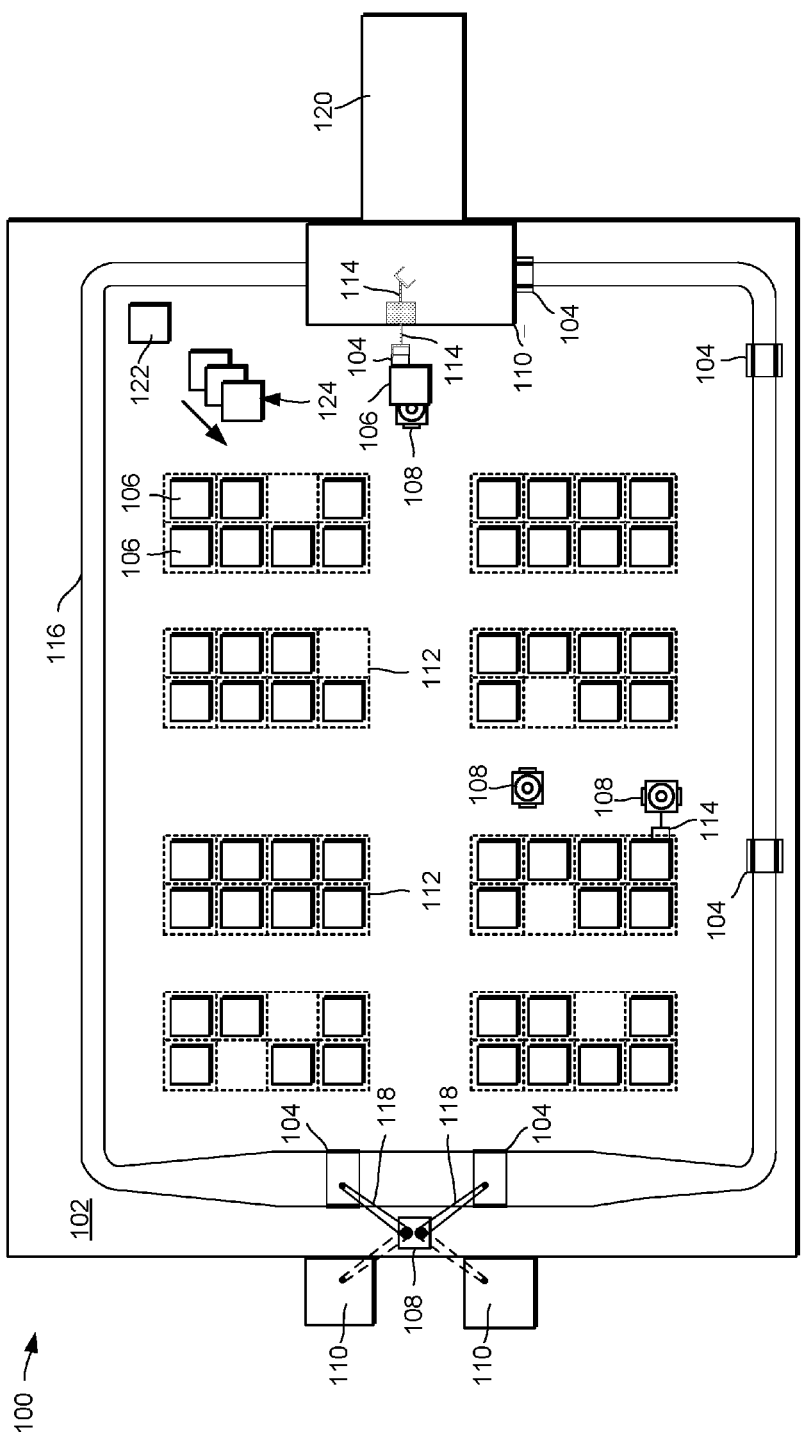
FIG. 1 is a block diagram illustrating an example configuration of an inventory management and/or order fulfillment system.

FIG. 1 illustrates an example configuration of an inventory management and/or order fulfillment system 100 that includes an inventory facility 102 that is used to store inventory items that are ordered by and shipped to customers and/or other entities. In various examples, the inventory facility 102 may be a partially and/or fully automated mobile fulfillment system in which inventory items are stored in fabric totes 104 housed in portable inventory pods 106. The inventory items stored in the fabric totes 104 may comprise any objects suitable for storage, retrieval, and/or processing by the system 100. In various examples, inventory items may include items that are part of an order, packaging elements for the orders, and essentially any other item or element that might be used by the inventory management and order fulfillment system (e.g., toys, books, clothing, kits, shoes, dunnage, packaging material, cardboard, garbage, etc.). In some examples, the inventory management and/or order fulfillment system 100 may be implemented by an airport luggage facility. In such an example, the inventory items may include pieces of luggage stored in a luggage facility. In another example, the inventory management and/or order fulfillment system 100 may be implemented by a manufacturing facility. In such an example, the inventory items may include components of a manufacturing kit. More specifically, inventory items may represent components intended for inclusion in an assembled product, such as electronic components for a customized computer system.

The fabric totes 104 may be of varying sizes capable of holding one or more types of inventory items. In some examples, the fabric totes 104 may have unique identifiers associated with unique identifiers of the inventory items located therein and/or a respective inventory pod 106. The unique identifiers associated with the fabric totes may comprise labels on an outer front portion of the fabric tote and/or on an outer portion of the inventory pod housing the fabric tote.

In various examples, the inventory pods 106 housing the fabric totes 104 may be moved about the facility 102 by mobile drive units 108 (e.g., mechanical devices). The mobile drive units 108 may be "unmanned" or "robotic" drive units, such as self-powered, wheeled devices configured to move autonomously about the facility 102 without direct human supervision. While some mobile drive units 108 may be "unmanned"—and therefore do not transport a human—other mobile drive units 108 (or simply "drive units") described herein may be configured to transport a human, regardless of whether that human controls the navigation of the corresponding drive unit 108. In general, the drive units 108 may be powered, propelled, and controlled in any manner appropriate based on the configuration and characteristics of the system 100.

As illustrated on the right side of facility 102, the drive units 108 may deliver the inventory pod 106 to a workstation 110, place it on the facility floor, and drive to another location in the facility 102. Alternatively, the drive units 108 may deliver the inventory pod 106 to the workstation 110, and when directed, may return the inventory pod 106 to a designated location 112.

The workstations 110 may include locations designated for the completion of particular tasks involving inventory items. Such tasks may include the transfer of a fabric tote 104 from one inventory pod to another inventory pod (e.g., to keep totes with similar inventory items in proximity), the removal of inventory items from the fabric totes 104, the introduction of inventory items into the fabric totes 104, the counting of inventory items in the fabric totes 104, the decomposition of inventory items (e.g. from pallet or case-sized groups to individual inventory items), and/or the processing or handling of inventory items in any other suitable manner. The workstations 110 may be partially and/or fully automated.

In various examples, the workstations 110 may represent the physical locations where a particular task involving inventory items can be completed within the facility 102. Additionally, the workstation 110 may represent associated equipment, such as scanners, cameras, and other equipment used for monitoring the movement of inventory items.

In various examples, the drive units 108 may deliver the fabric totes 104 to the workstations 110, such as via an extractor 114. In such examples, the drive unit 108 may drive to an inventory pod 106 at the designated location 112 and the extractor 114 may extract a fabric tote 104 from the inventory pod 106. The drive unit 108 may then deliver the fabric tote 104 to the workstation 110 and/or other location in the facility 102.

In various examples, the drive unit 108 may deliver the fabric tote 104 to a conveyor system 116 via the extractor 114. As illustrated in FIG. 1, the conveyor system 116 may include two cables, on which the handles of the fabric tote 104 may travel. In other examples, the conveyor system 116 may include two rails, a belt, a single cable, a single rail, or another conveyor-type system. The conveyor system 116 may be configured to partially and/or fully circumnavigate the facility 102. Additionally or alternatively, the conveyor system 116 may be configured from the workstation 110 to an on-load/off-load facility, such as a loading dock, a designated location 112, or other location in the facility 102.

In various examples, the facility 102 may comprise multiple floors, stacked in a vertical configuration. In such examples, the conveyor system 116 may be configured to transport totes from one floor to another floor. For example, the conveyor system may run from third floor of a three-story facility down to the first floor, and vice versa.

As illustrated on the left side of facility 102, the cables or rails of the conveyor system 116 may diverge to an increased distance, such as when approaching a workstation 110. In such examples, the handles of the fabric totes 104 may be separated, thereby facilitating access to the contents of the fabric tote 104. In various examples, the workstation 110 may include a robotic arm 118 configured to retrieve or "pick" ordered items from, store or "stow" inventory items into, or otherwise manipulate or adjust inventory items in the fabric totes 104. For example, the robotic arm 118 may remove a designated inventory item from the fabric tote 104 on the conveyor system 116, and deliver it to the workstation 110. Additionally or alternatively, a human worker may be located at the workstation 110, and may extract the fabric totes 104 from the conveyor system 116 and manipulate the contents therein.

As illustrated on the right side of facility 102, the fabric tote 104 may travel on the conveyor system 116 into the workstation 110. In some examples, the work station 110 may include an extractor 114 configured to remove the fabric tote 104 from the conveyor system. The extractor 114 may be configured to insert the fabric tote 104 into the inventory pod 106 and/or deliver the fabric tote 104 to a work desk, or other location within the workstation 110.

Additionally, the extractor 114 may be configured to partially and/or fully extract the fabric tote 104 from the inventory pod 106. Once fully removed from the inventory pod 106, the extractor 114 may place the extracted fabric tote 104 on the conveyor system 116 and/or at a location in the workstation 110. Additionally or alternatively, a human worker may remove the fabric tote 104 from the conveyor system and/or the inventory pod 106, and deliver it to a location in the facility 102.

As a specific example, a received order may specify a plurality of inventory items. In response to such an order, the fabric totes 104 containing the inventory items are moved in the inventory pods 106 by the drive units 108 and/or via the conveyor system 116 to the workstation 110 where the robotic arm 118 and/or a worker retrieves the ordered items. In addition, certain fabric totes 104 that have been loaded with specified inventory items may also be moved to or onto a transport vehicle for shipment to a different inventory facility, such as, for example, via a cargo compartment 120 located at a loading dock of the inventory facility 102.

As another example, inventory restocking may be performed when receiving new inventory at the inventory facility 102. The mobile fulfillment system may identify fabric totes 104 housed in one or more inventory pods 106 that are to be used for storage of the incoming inventory items. For example, the fabric totes 104 and/or the one or more inventory holders 106 may include a unique identifier that the mobile fulfillment system utilizes to identify the fabric totes 104 and/or the one or more inventory holders 106. The drive units 108 and/or conveyor system 116 may deliver the identified fabric totes 104 to the workstation 110 at the location of the new inventory. The robotic arm 118 and/or a worker may then load the new inventory into the fabric totes 104. After being loaded, the drive units 106 and/or conveyor system 116 may move the fabric totes 104 to appropriate locations within the facility 102 for storage or to the cargo compartment 120 of a transport vehicle for delivery, such as to a different inventory facility.

In various examples, the drive units 108 and/or conveyor system 116 may move the inventory holders 106 between locations within the facility 102 under the general direction and control of a management component 122. The management component 122 may assign tasks 124 to the drive units 108, the extractor 114, the robotic arm 118, and/or other components of the system. In addition, the management component 122 may coordinate operation of the drive units 108 in completing the tasks 124. The tasks 124 may relate not only to the movement and processing of fabric totes 104, but also to the management and maintenance of the components of the system 100.

For example, the management component 122 may assign portions of the facility 102 as parking spaces for the mobile drive units 108, the scheduled recharge or replacement of mobile drive unit batteries, the storage of empty fabric totes 104 and/or inventory pods 106, or any other operations associated with the functionality supported by the system 100 and its various components. For another example, the management component 122 may communicate with one or more scanners at workstations 110, for monitoring the flow of inventory items in and out of the system 100.

Although shown in FIG. 1 as a single, discrete component, the management component 122 may represent multiple components and may represent or include portions of the drive units 108, fabric totes 104, the extractor 114, the robotic arm 118, or other elements of the system 100. Additionally, the management component 122 may control operations via a single computing system in the facility 102, across multiple computing systems in the facility 102, and/or via one or more computing systems outside of the facility 102 (e.g., cloud computing system). As a result, any or all of the interaction between a particular drive unit 108, a particular fabric tote 104, a particular extractor 114, a particular robotic arm 118, and the management component 122 that is described below may in particular embodiments represent peer-to-peer and/or Wi-Fi communication between that drive unit 108, that fabric tote 104, that extractor 114, and/or that robotic arm 118 and one or more other drive units 108, fabric totes 104, extractors 114, and/or robotic arms 118.

The drive units 108 may be capable of communicating with the management component 122 to receive information identifying selected fabric totes 104 and/or inventory holders 106, to transmit the locations of the drive units 108, and/or to exchange any other suitable information to be used by the management component 122 or the drive units 108 during operation. The drive units 108 may communicate with the management component 122 wirelessly, using wired connections between the drive units 108 and the management component 122, and/or in any other appropriate manner. As one example, particular embodiments of the drive unit 108 may communicate with the management component 122 and/or with one another using 802.11, Bluetooth, or Infrared Data Association (IrDA) standards, or any other appropriate wireless communication protocol. Furthermore, as noted above, the management component 122 may include components of individual drive units 108. Thus, communications between the management component 122 and a particular drive unit 108 may represent communication between components of the particular drive unit 108.

The system 100 may be implemented by or within any facility or system for storing and processing inventory items, and inventory items may represent objects of any type suitable for storage, retrieval, and/or processing in a particular system 100. In addition, the system 100 and the techniques described herein may apply in any environment in which it may be advantageous to move individual, unmanned drive units about an environment.

As illustrated in FIG. 1, the system 100 may include a facility 102 of a predetermined, fixed, and finite physical space. In other examples, the facility may be of variable dimensions and/or an arbitrary geometry. Additionally, while the facility 102 may be enclosed in a building, alternative examples may utilize facilities 102 in which some or all of the facility 102 is located outdoors, within a vehicle (such as a cargo ship), or otherwise unconstrained by any fixed structure. Moreover, in particular embodiments, the facility 102 may include multiple portions that are physically separated from one another, including but not limited to separate floors, rooms, buildings, and/or portions divided in any other suitable manner.

Figure 2:
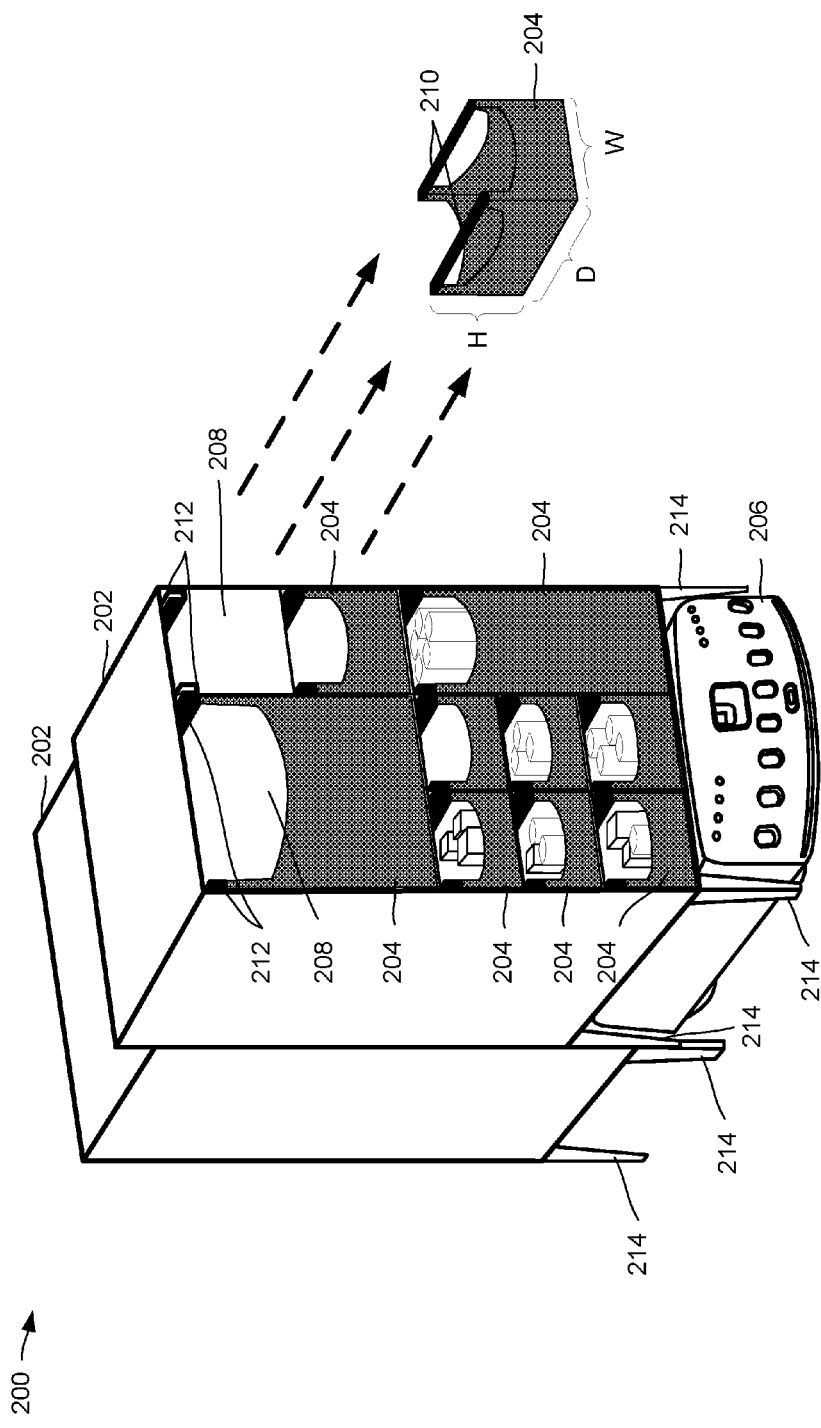
FIG. 2 illustrates a perspective view of an example inventory pod with fabric totes and a mobile drive unit that may be used in the inventory management and/or order fulfillment system of FIG. 1.

FIG. 2 is a perspective view of an example inventory pod 202, with fabric totes 204, such as fabric tote 104, and a drive unit 206, such as drive unit 108, that may be used in the inventory management and/or order fulfillment system of FIG. 1.

The inventory pod 202, such as inventory pod 106, may include one or more storage spaces 208 to house fabric totes 204. The fabric totes 204 may be used for storing and transporting inventory items of various sizes, shapes and weights. The fabric totes 204 may include a fabric or fabric-like material, such as woven material, nonwoven material, Tyvek®, vinyl, canvas, cotton, plastic, nylon, polyester, Kevlar®, or other synthetic material or composite, other flexible materials including natural fibers such as bamboo, silk, wool or others, animal hides/skins, plant-based materials such as coconut husks, palm leaves or others. The fabric totes 204 may include a base portion and side portions of fabric or fabric-like material.

In various examples, the base portion and the side portions of the fabric totes 204 may be constructed with structural elements of any suitable combination of structural material, such as plastic, metal, carbon-based products, fiberglass, wood, and any other structural material. The structural elements may be sewn or otherwise incorporated into the fabric or fabric-like material of the fabric tote 204. In some examples, the structural element of the base portion and/or the side portions may be substantially the size of the respective portions. In other examples, the structural element of the base portion and/or the side portions may be smaller than the respective portion. For example, the structural element of at least two of the side portions may comprise ribbing of structural material.

As illustrated in FIG. 2, the fabric totes 204 may be of varying sizes (i.e., height (H), width (W), depth (D)) of a substantially rectangular cross-sectional area. In other examples, the fabric totes 204 may be the same size. In yet other examples, the fabric totes 204 may be of different shapes, such as, for example, a circular shape, an ovular shape, a triangular shape, a hexagonal shape, an octagonal shape, etc. In some examples, a depth (D) of the fabric tote 204 may be equal to a depth of the inventory pod 202. In some examples, the depth of the fabric tote 204 may be greater than or less than half of the depth of the inventory pod 202, such that one storage space 208 may be capable of housing two or more fabric totes 204. For example, a first fabric tote with a depth less than half the depth of an inventory pod may share a storage space with a second fabric tote with a depth greater than half the depth of the inventory pod. In such an example, the depths of the first fabric tote and the second fabric tote together are equal to or less than the depth of the inventory pod.

In various examples, the fabric totes 204 may include one or more handles 210. The handles 210 may comprise a metal material (e.g., aluminum, aluminum alloy, steel, titanium, combinations thereof, etc.), a plastic material (e.g., polyethylene, polypropylene, acrylonitrile butadiene styrene, polycarbonate, combinations thereof, etc.), a ceramic material, a wood material, or any other type of material capable of supporting the fabric tote 204. In some examples, the handles 210 may comprise a substantially hard, pliable material. For example, the handles may be capable of bending slightly in order to clear turns in a conveyor system. In other examples, the handles 210 may comprise a substantially hard, non-pliable material. In various examples, the handles 210 may comprise a hinge or other flexible element to facilitate bending through turns in the conveyor system.

In various examples, the fabric totes 204 may be housed in the storage spaces 208 of the inventory pods 202 by sliding the handles 210 along rails 212. In such examples, the fabric tote 204 may be partially and/or fully inserted into and extracted out of the inventory pod 202 via the rails 212. The rails 212 may comprise a metal material, a plastic material, a ceramic material, a wood material, or any other type of material capable of supporting the fabric tote 204.

In various examples, the handles 210 may include an outer casing that extends substantially the depth D of the fabric tote 204. In such examples, the outer casing may comprise the main gripping and/or lifting surface for the fabric tote 204. In some examples, the outer casing may be configured to slide directly on the rails 212, or other surface, such as a cable. Additionally or alternatively, the handles 210 may include one or more rollers to assist the handle in sliding along the rail 212, or other surface. The rollers may include a wheel, a ball bearing, or other material to facilitate movement along a rail or other surface. In some examples, the rail 212 may comprise a different material than the handles 210, to assist the handle in sliding along the rail 212 or other surface. In such examples, the materials may be chosen to have desired static and/or kinetic frictional properties based on desired resistance to movement (i.e., the desired threshold force that must be applied by a user and/or an extractor to move the fabric tote relative to the rail).

In some examples, the rails 212 may include a resistance or frictional surface and/or material on the surface that may increase friction to more firmly secure the handles 210 of fabric tote 204. Examples of the frictional material can include rubber, polyurethane, nylon, Teflon, silicone, polypropylene, acrylonitrile butadiene styrene (ABS), polyethylene or the like. Frictional material may be chosen to have desired static and/or kinetic frictional properties based on desired resistance to movement. Additionally or alternatively, the rails 212 may include a notch, a latch, a snap, a hook, or any other device or machining process that may secure the fabric tote 204 in the storage space 208.

In various examples, the railings 212 of adjacent inventory pods 202 may line up with one another, such that fabric totes 204 may easily transferred from one inventory pod 202 to another. In such examples, an extractor and/or a human worker may exert a force on the fabric tote 204 causing the fabric tote to slide on the rail 212 from one inventory pod to another. Thus, two inventory pods 202 may be loaded with fabric totes 204 from a single position. The adjacent inventory pods 202 may be coupled together, such as via a latch on an outer wall of the inventory pod 202 or via a connection (e.g., magnetic, mechanical, etc.) between two or more rails in the adjacent inventory pods 202. In other examples, the inventory pod 202 may have a backing, which stops the transfer of fabric totes 204 from one inventory pod 202 to another. In some examples, the backing may be removable, such as a fabric flap that may be rolled up and/or removed from the back of the inventory pod.

In various examples, the fabric totes 204 may include a unique identifier, which in some instances may be associated with a unique identifier of the inventory items stored in the fabric tote 204 and/or the inventory pod 202 in which the fabric tote 204 is housed. In some examples, the inventory pod 202 may comprise a unique identifier, and each of the fabric totes 204 in the particular inventory pod 202 may store the same inventory item. For example, the fabric totes in a particular inventory pod may contain boxes of pencils. The unique identifier may be a bar code, a QR code, an NFC tag, a beacon, or any other identifier recognizable by a scanner, camera and/or a human worker.

Additionally or alternatively, different combinations of materials, colors, and sizes of the inventory pods 202 and/or fabric totes 204 may be used to identify particular inventory pods 202, fabric totes 204, and the contents therein, in order to increase the functionality and efficiency of the inventory management and/or order fulfillment system. For example, different combinations of the above characteristics may be used to depict shelf height, product location, labeling, and other storage-related aspects for identifying fabric totes storing particular inventory items. For example, the inventory pod may include a first row or column of fabric totes associated with a first color and a second row or column of fabric totes associated with a second color different from the first color. A camera associated with an extractor and/or a human worker may identify the first row or column or the second row or column based on the first and/or second colors to obtain an inventory item contained in a fabric tote arranged in the first row or column of fabric totes or in the second row or column of fabric totes.

Furthermore, in some examples, the fabric tote 204 and/or inventory pod 202 can be a color associated with an inventory item. For example, a fabric tote may be a particular color indicating a high value item, a hazardous material item, a fragile item, a perishable item, etc.

In various examples, the inventory pod 202 may be transported to a workstation for on-load and/or offload of the inventory items into the fabric totes 204. In various examples, the inventory pod 202 housing the fabric totes 204 may be transported to a workstation, such as workstation 110, via the drive unit 206.

The drive unit 206 may include a motorized lift having a plurality of wheels and a lift mechanism. The lift mechanism may be a surface, a projection(s) (e.g., a tooth, a tang, a tongue, a pin), a coupling (e.g., a self-locking joint), etc. One or more of the plurality of wheels may be driven to move the drive unit 206 over the floor or surface of an inventory facility, such as inventory facility 102. One or more of the plurality of wheels may be steerable to guide the drive unit 206 in different directions or paths.

The lift surface of the drive unit 206 may be configured to dock with the inventory pod 202 by raising the lift surface into engagement with a base portion of the inventory pod 202. In operation, the drive unit 206 may be configured to maneuver itself beneath the inventory pod 202, to raise the inventory pod 202 off of the floor or surface, and to move the inventory pod 202 to any desired location under the direction of or in response to instructions from a management component, such as management component 122. After reaching the desired location, the drive unit 206 may undock from the inventory pod 202 by lowering the lift surface and thereby placing the inventory pod 202 back on the surface or floor.

In various examples, the drive unit 206 may lower the inventory pod 202 until a plurality of legs 214 of the inventory pod 202 contact the surface or floor. The plurality of legs 214 extend downward from the base of the inventory pod 202, and support the inventory pod 202 on the floor or surface of the inventory facility and/or a transport vehicle. In such examples, the legs 214 may provide a space above the floor and between each other so that the drive unit 206 can maneuver itself beneath the inventory pod 202.

Although FIG. 2 illustrates a particular embodiment of drive unit 206 containing certain components and configured to operate in a particular manner, the mobile drive unit 206 (e.g., mechanical device) may comprise any appropriate component and/or collection of components configured to transport and/or facilitate the transport of inventory pods 202 and fabric totes 204. For example, the drive unit 206 may include an extractor, such as extractor 114, for removing a particular fabric tote 204 from, and inserting the particular fabric tote 204 into, an inventory pod 202.

Additionally, the mobile drive units 206 may include at least one imaging device, e.g., a camera, which is aimed toward a predefined surface, such as a floor surface, a wall surface, a ceiling surface, or the like. In one particular example, a drive unit 206 may include a camera pointed substantially downwards towards to a floor surface. The drive unit 206 may capture images of the floor surface and may compare these images to a pre-existing map to identify the unit's location within a facility as well as to determine how to navigate to other locations in the facility. As such, the floor surface may include an image, which may be painted on, etched in, or otherwise formed within or applied to the floor surface. For instance, the image may be based on multiple different colors painted or applied to the floor, etchings in the floor, natural non-uniform textures of a particular material from which the floor has been made, and/or combinations thereof.

In various examples, the drive unit 206 may include a camera and/or a scanner for scanning unique identifiers on the inventory pod 202 and/or the fabric totes 204. In some examples, the camera and/or scanner for scanning unique identifiers may be mounted on an arm of the drive unit 206, to facilitate scanning unique identifiers located at various locations on the inventory pod 202 and/or fabric totes 204. In such examples, the arm may be telescopic. Additionally or alternatively, the camera and/or the scanner may be mounted on an extractor configured to manipulate the fabric tote 204 and/or a robotic arm configured to manipulate the inventory items located therein.

FIGS. 3A and 3B illustrate exploded front views of an example fabric tote 300. FIG. 3A depicts the fabric tote 300 in a neutral position. FIG. 3B depicts the fabric tote 300 in an open position. In some examples, the fabric tote 300 may be a type of the fabric tote 204 of FIG. 2 and fabric tote 104 of FIG. 1. Thus, the fabric tote 300 may be suitable for being housed in an inventory pod, such as inventory pod 202 of FIG. 2. Additionally, the fabric tote 300 may be suitable for being transported on a conveyor system, such as conveyor system 116.

As discussed above, the fabric tote 300 may comprise a fabric or fabric-like material. In some examples, the fabric or fabric-like material may comprise a slightly elastic material. The fabric tote 300 may include a base portion 302, and side portions 304. While only a front side portion 304 is shown in FIG. 3A, it is understood that the fabric tote may include other side portions 304, such as a back, a left, and a right side portions for a rectangular-shaped fabric tote 300.

As illustrated in FIGS. 3A and 3B, the side portions 304 may be configured to allow the handles 306, such as handles 210, to extend outward from a neutral position of FIG. 3A to an open position of FIG. 3B, thus facilitating access to the inventory items 308 in the fabric tote 300. In various examples, the side portions 304 and the base portion 302 may comprise the same material. In some examples, the base portion 302 and the side portions may comprise different materials. For example, the base portion and the left and right side portions of a fabric tote may comprise a fabric material with little to no elasticity, while the front and the back side portions may comprise a fabric material with elasticity. In such an example, the fabric tote 300 may be capable of opening to an extended open position at FIG. 3B.

In various examples, the base portion 302 and the side portions 304 of the fabric tote 300 may be constructed with structural elements of any suitable combination of structural material, such as plastic, metal, carbon-based products, fiberglass, wood, and any other structural material. In some examples, the structural element of the base portion and/or the side portions may be substantially the size of the respective portions. In other examples, the structural element of the base portion and/or the side portions may be smaller than the respective portion. In at least one example, the structural element of the side portions may comprise ribbing of structural material.

Additionally or alternatively, the side portions 304 may be supported at each corner, such as with a structural material extending from the base portion 302 to the handle 306. The corner support may be external and/or internal. For example, the corner support may include a metal corner plate attached to the outside of a corner where two side portions attach. For another example, the corner support may include a rod that is inserted into a sleeve at a corner between two side portions.

In various examples, handles 306 may be coupled to the fabric tote 300 via a connector 308. As illustrated in FIGS. 3A and 3B, the connector 308 may comprise a Y-shape. In other examples, the connector 308 may comprise a C-shape, a V-shape, a rectangular shape, or other shape.

In the illustrative example, the handles 306 of the fabric totes 300 may include an outer casing 310 and one or more rollers 312. The outer casing 310 may extend substantially the depth of the fabric tote 300, as illustrated by handles 210 of FIG. 2. The outer casing 310 may comprise a metal material, a plastic material, a ceramic material, a wood material or other material for supporting the weight of the fabric tote 300 and contents thereof. In some examples, the outer casing 310 may comprise a substantially pliable material, such that the outer casing may bend slightly when traveling on a conveyor system.

In various examples, the outer casing 310 of the handle 306 may comprise a surface texture, e.g., knurling, indentations, raised features, or combinations thereof, to assist in the gripping of the outer casing 310 of the handle 306 by a machine (e.g., a robotic arm, an extractor, an unmanned aerial vehicle, etc.) and/or a human worker.

Additionally or alternatively, the outer casing 310 may include a resistance or frictional surface and/or material on the surface that may increase friction between the outer casing 310 and a machine and/or human worker grabbing the handle 306. Examples of the frictional material can include rubber, polyurethane, nylon, Teflon, silicone, polypropylene, acrylonitrile butadiene styrene (ABS), polyethylene or the like. Frictional material may be chosen to have desired static and/or kinetic frictional properties.

In various examples, the one or more rollers 312 of the handle 306 may be coupled to the outer casing 310. The rollers 312 may include wheels, ball bearings, roller bearings, or any other bearing or structure to facilitate movement of the handle 306 along a rail 314, such as rail 212, or along a conveyor system. The rollers 312 may be configured at a front end of the handle 306, a back end of the handle 306, and/or at spaced intervals between the front end and the back end of the handle 306 along the outer casing 310. The rollers 312 may comprise a metal material, a ceramic material, a plastic material, a composite material, or combinations of the foregoing. In various examples, the rollers 312 may be coupled to and driven by one or more electric motors in the handle 306, to facilitate movement along a surface, such as a rail or a cable of a conveyor system.

In other examples, the handle 306 may not include a roller, but instead may comprise the outer casing 310 and an inner fixed structure configured to slide along the rail 314. In such examples, the inner fixed structure of the handle 306 may comprise a different material than the rail 314 to facilitate the sliding. For example, the rail may comprise a metal material, and the handle may comprise a plastic material and/or fabric material.

As discussed above, the fabric tote 300 may be configured to extend from a neutral position as illustrated in FIG. 3A to an open position, as illustrated in FIG. 3B. The open position may facilitate the removal, addition, or other manipulation of inventory items 308 in the fabric tote 300. In various examples, an extractor, such as extractor 114, may connect to the fabric tote 300 via the handles 306, and may extend the distance between the handles 306 of the fabric tote 300 to the open position illustrated in FIG. 3B. In the open position, a human worker and/or a robotic arm 316, such as robotic arm 118, may be able to easily access one or more inventory items 318 stored the fabric tote 300, to insert and/or remove individual items from the fabric tote 300.

In various examples, the fabric tote 300 may be configured to rest in the open position. As illustrated in FIG. 3B, the handles 306 of the fabric tote 300 may rest at an angle in the open position, substantially in line with the respective side portion. In some examples, the handles 306 of the fabric tote 300 may rest in a substantially vertical position when the fabric tote 300 is in the open position. For example, an extractor may couple to handles of a fabric tote, remove the fabric tote from an inventory pod, and spread the handles horizontally into the open position. In such an example, the extractor may maintain the orientation of the handles in a substantially vertical position while spreading the handles horizontally. For another example, as described below with respect to FIG. 4, the handles may rest in a substantially vertical position while in a closed position, with the handles proximate to one another.

In various examples, the fabric tote 300 may include a positional bias. The positional bias may comprise a spring component, or other mechanical component to create a bias toward a particular position. The positional bias may be toward the open position (FIG. 3B) to facilitate access to the contents of the fabric tote, toward a closed position to ensure inventory items 318 are securely held, or toward the neutral position (FIG. 3A). For example, if a human worker placed the fabric tote with a positional bias toward the open position, a spring or other component in the side portion of the fabric tote would cause the fabric tote to move to and rest in the open position, such as that illustrated in FIG. 3B.

Additionally or alternatively, the fabric tote may include a restoring component. The restoring component may include a spring component or other mechanical component configured to restore the fabric tote 300 from an open position to the neutral position and/or the closed position.

Figure 3:
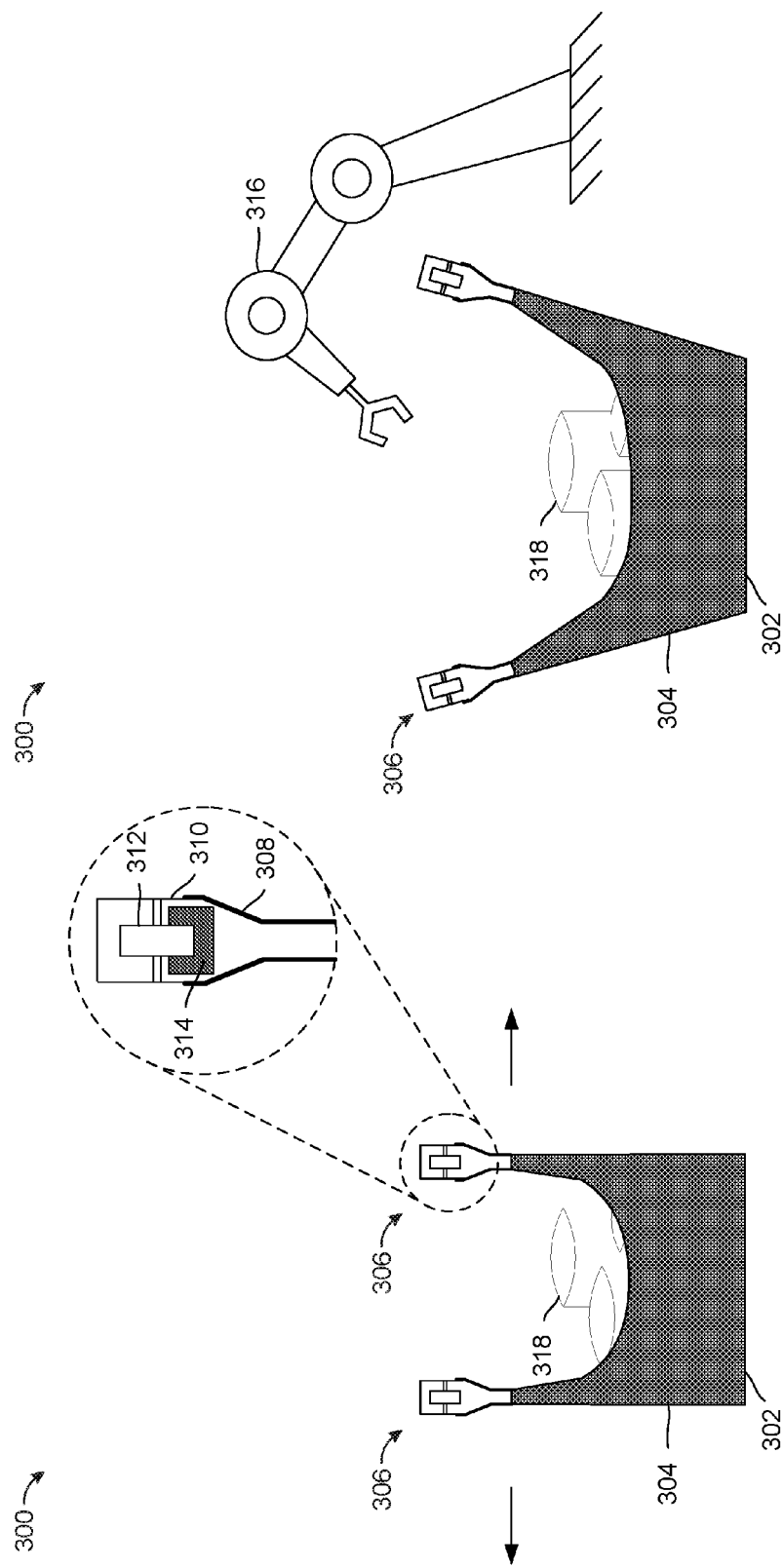
FIGS. 3A and 3B illustrate exploded, perspective views of an example fabric tote.
Figure 4:
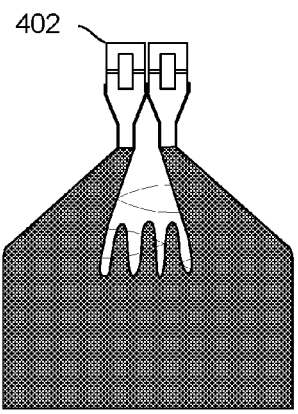
FIG. 4 illustrates an example fabric tote with handles configured to connect together in a closed position.

FIG. 4 illustrates an example fabric tote 400 with handles configured to connect together in a closed position. Fabric tote 400 may be any of the fabric totes described in FIGS. 1-3.

In various examples, the handles 402, which may be handles 306, may be configured to secure to one another in the closed position. The handles 402 may include fasteners, such as latches, magnets, snaps, hooks, hook and loop, male/female connectors, or any other type of fastener capable of joining two handles 402 of a fabric tote 400 together. In such examples, the handles 402 may be latched together in the closed position to facilitate the transport of the fabric tote 400. For example, in the closed position, it may be easier for a human worker to pick up the tote in one hand. For another example, in the closed position, an unmanned aerial vehicle may be able to securely hold the fabric tote for delivery to another location. For yet another example, the handles of the fabric tote may be secured around a single-cable conveyor system. In such an example, the single-cable conveyor system may transport the fabric tote to various locations in a facility, with the inventory items securely held in the fabric tote.

Figure 5:
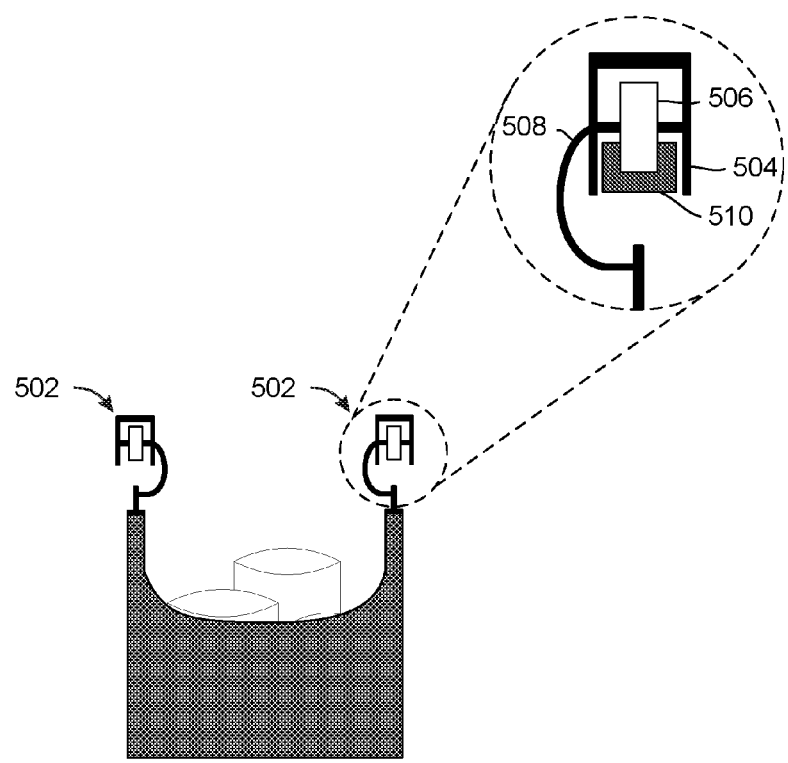
FIG. 5 illustrates an example fabric tote with handles attached to the fabric tote via C-shaped connectors.

FIG. 5 illustrates an example fabric tote 500 with handles 502 attached to the fabric tote via C-shaped connectors. Fabric tote 500 may be any of the fabric totes described in FIGS. 1-4.

In various examples, the handles 502 of the fabric tote 500 may include an outer casing 504, one or more rollers 506 and one or more connectors 508. The outer casing 504 may extend the depth of the fabric tote 500, and may comprise the main gripping surface for the fabric tote 500. The outer casing 504 may comprise a metal material, a plastic material, a ceramic material, a wood material or other material for supporting the weight of the fabric tote 500. In some examples, the outer casing may comprise a substantially pliable material, such that the outer casing may bend slightly when traveling on a conveyor system, such as conveyor system 116.

In various examples, the outer casing 504 of the handle 502 may comprise a surface texture, e.g., knurling, indentations, raised features, or combinations thereof, to assist in the gripping of the outer casing 504 of the handle 502 by a machine (e.g., a robotic arm, an extractor, an unmanned aerial vehicle, etc.) and/or a human worker.

Additionally or alternatively, the outer casing 504 may include a resistance or frictional surface and/or material on the surface that may increase friction between the outer casing 504 and a machine and/or human worker grabbing the handle 502. Examples of the frictional material can include rubber, polyurethane, nylon, Teflon, silicone, polypropylene, acrylonitrile butadiene styrene (ABS), polyethylene or the like. Frictional material may be chosen to have desired static and/or kinetic frictional properties.

As illustrated in FIG. 5, the handle 502 may include one or more rollers 506 coupled to the outer casing 504. The rollers 506 may comprise a wheel, a roller bearing, or other structure configured to roll and/or facilitate movement of the handle 502 along a rail 510, a cable of a conveyor system, and/or other surface. The rollers 506 may be configured at a front end of the handle 502, a back end of the handle 502, and/or at spaced intervals between the front end and the back end of the handle 502 along the outer casing 504.

The rollers 506 may comprise a metal material, a ceramic material, a plastic material, a composite material, or combinations of the foregoing. In various examples, the rollers 506 may be coupled to and driven by one or more electric motors in the handle 502, to facilitate movement along a surface, such as the rail 510 or a cable of a conveyor system.

In various examples, the outer casing 504 of the handle 502 may be coupled to the fabric tote 500 via one or more connectors 508. In the illustrative example of FIG. 5, the connector 508 is a C-shaped connector. The C-shaped connector 508 may facilitate loading the fabric tote 500 on and off a conveyor system. While the C-shaped connectors 508 are illustrated as having an open end of the connector facing outboard, the C-shaped connector 508 may be configured to have the open end of the connector facing inboard, toward opposing connectors 508, or the C-shaped connectors 508 may be configured to face a same side of the fabric tote 500.

In other examples, the connector 508 may be a Y-shape (as illustrated in FIGS. 3 and 4), a V-shape, a box-shape, or any other shape connector. The connector 508 may comprise a metal material, a plastic material, a composite material, or combinations of the foregoing. In some examples, the connector 508 and the outer casing 504 may be machined as a single piece of material. In other examples, the connector 508 and the outer casing 504 may be separate components of the handle 502, coupled to each other via fasteners (e.g., rivets, bolts, screws, etc.).

Figure 6:
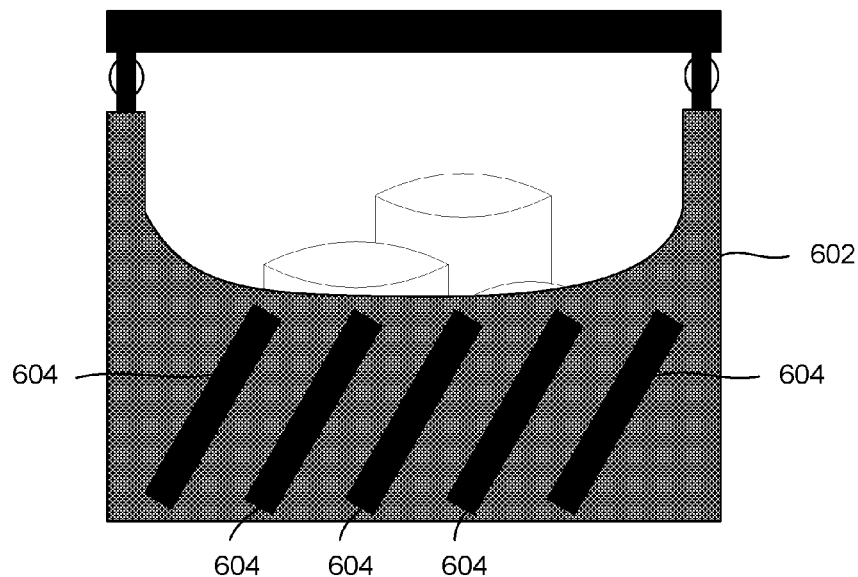
FIG. 6 illustrates an example fabric tote with ribbing to support the sides of the fabric tote.

FIG. 6 illustrates a side view of an example fabric tote 600 with ribbing to support the sides and/or the bottom of the fabric tote. The example fabric tote 600 is a rectangular shaped fabric tote, which comprises four side portions 602. In other examples, the fabric tote 600 may comprise a greater number of side portions 602.

As discussed above, the side portions 602 comprise a fabric or fabric-like material. The side portions 602 of the fabric totes 600 may be constructed with structural elements 604 of any suitable combination of structural material, such as plastic, metal, carbon-based products, fiberglass, wood, and other structural material. In some examples, the structural element 604 of the side portion 602 may be substantially the size of the respective side portion 602. In the illustrative example, the structural element 604 of the side portion 602 comprises a plurality of ribs of structural material. In such an example, the structural element 604 may provide structural support, while also permitting a degree of flexibility in the side portion 602. While the structural elements 604 are illustrated as a plurality of substantially rectangular ribs of equal size, the structural elements 604 may comprise any shape and/or size relative to one another. For example, the structural elements may comprise ribs of a honey comb structure. For another example, the plurality of ribs may be configured at an angle and may increase in size toward the center of the side portion, and decrease in size toward a top left corner and a bottom right corner.

Figure 7:
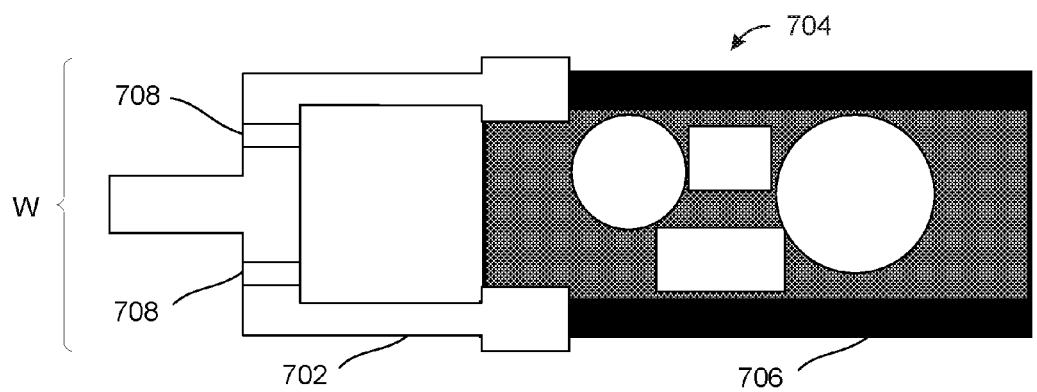
FIG. 7 illustrates a top view of an example extractor attached to a fabric tote.

FIG. 7 illustrates a top view of an example extractor 702 attached to a fabric tote 704. In various examples, the extractor 702, such as extractor 114, may comprise an end effector at a distal end of a robotic arm.

The extractor 702 may comprise a metal material, a plastic material, a composite material, a rubber material, or combinations thereof. The extractor 702 may be configured to grip the handles 706 of the fabric tote 704, such as via an impactive gripping mechanism (e.g., jaws, claws, clasps, etc.), an ingressive gripping mechanism (e.g., pins, hackles, etc.), an astrictive gripping mechanism (e.g., suction, etc.), or other type gripping mechanism. Alternatively or in addition, the extractor 702 may be configured similarly to the rails 212 of the inventory pod 202 or rails of the conveyor system 116.

Once gripped to the handles 706, the extractor 702 may be configured to partially and/or fully remove the fabric tote 704 from an inventory pod in order for a robotic arm and/or a human worker to access the contents of the fabric tote 704. In some examples, the extractor 702 may be coupled to a mobile drive unit, such as mobile drive unit 108. In such examples, the extractor 702 may be configured to fully extract and deliver the fabric tote 704 to a particular location in a facility under power of the mobile drive unit. Additionally or alternatively, the extractor 702 may be configured to place the fabric tote 704 onto a conveyor system for delivery to a workstation and/or particular location therein. At the particular location in the workstation, the robotic arm and/or the human worker may access the contents of the fabric tote 704. For example, the human worker may load the fabric tote with one or more inventory items. For another example, the robotic arm may remove a particular inventory item from the fabric tote, for shipment to a customer.

Additionally, the extractor 702 may be configured to remove the fabric tote 704 from the workstation and/or particular location therein and insert it into an inventory pod and/or a conveyor system.

In various examples, the extractor 702 may comprise a fixed width W, to fit a fabric tote of a particular size. In some examples, the width W of the extractor 702 may be adjustable. In such examples, the extractor 702 may comprise one or more extenders 708. The extenders 708 may comprise telescopic components, which permit the extractor 702 to increase and/or decrease the width W. In at least one example, the extenders 708 may increase the width W, thereby pulling the handles 706 away from each other, in order for a robotic arm and/or a human worker to more easily access the contents of the fabric tote 704.

Figure 8:
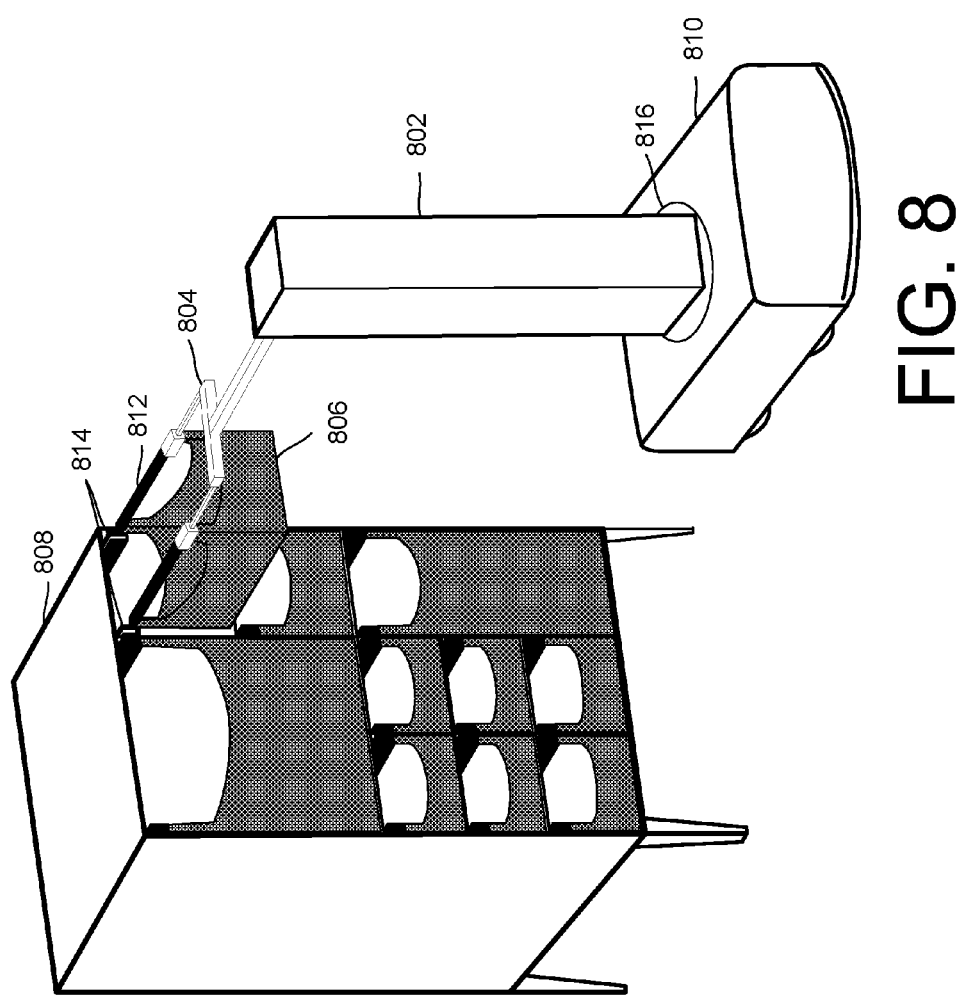
FIG. 8 illustrates a robot with the example extractor of FIG. 7 removing a fabric tote from an inventory holder.

FIG. 8 illustrates a robot 802 with the example extractor 804 of FIG. 7 removing a fabric tote 806 from an inventory pod 808. In some examples, the robot 802 may include a mobile platform 810. The mobile platform 810 may comprise a mobile drive unit, such as mobile drive unit 108. In other examples, the robot 802 may include a stationary platform.

As illustrated in FIG. 8, the robot 802 may be mounted on a top of the mobile platform 810. In other examples, the robot 802 may extend from a side of the mobile platform 810. In some examples, the robot 802 may be stored in a compartment on a side of the mobile platform 810, and may extend and retract the extractor 804 when necessary. For example, the robot may be stored in a mobile drive unit. When the mobile drive unit arrives at an inventory pod, the robot 802 may extend from a side of the mobile drive unit, and may remove a particular fabric tote from the inventory pod. The mobile drive unit may drive to a particular location at a workstation, and deliver the fabric tote.

In various examples, the robot 802 may include the extractor 804 to grip the fabric tote 806. The extractor 804 may grip handles 812 of the fabric tote 806 while the fabric tote is fully inserted into the inventory pod 808. The robot 802 may then cause the extractor 804 to extract the fabric tote 806 from the inventory pod 808 by sliding the handles 812 along rails 814. In various examples, the rails 814 of the inventory pod 808 may include a notch, a latch, a snap, a hook, or any other device or machining process to secure the fabric tote 806 in the inventory pod 808. In such examples, the extractor 804 may be configured to unlatch, unsnap, or otherwise overcome the securing mechanism, to remove the fabric tote 806 from the inventory pod 808.

In various examples, the robot 802 may include a track for raising and lowering the extractor 804. Additionally or alternatively, the robot 802 may include a telescopic component for raising and lowering the extractor 804. In some examples, the robot 802 and/or the mobile platform 810 may include a rotational component 816, to allow the extractor to rotate clockwise and/or counterclockwise.

Figure 9:
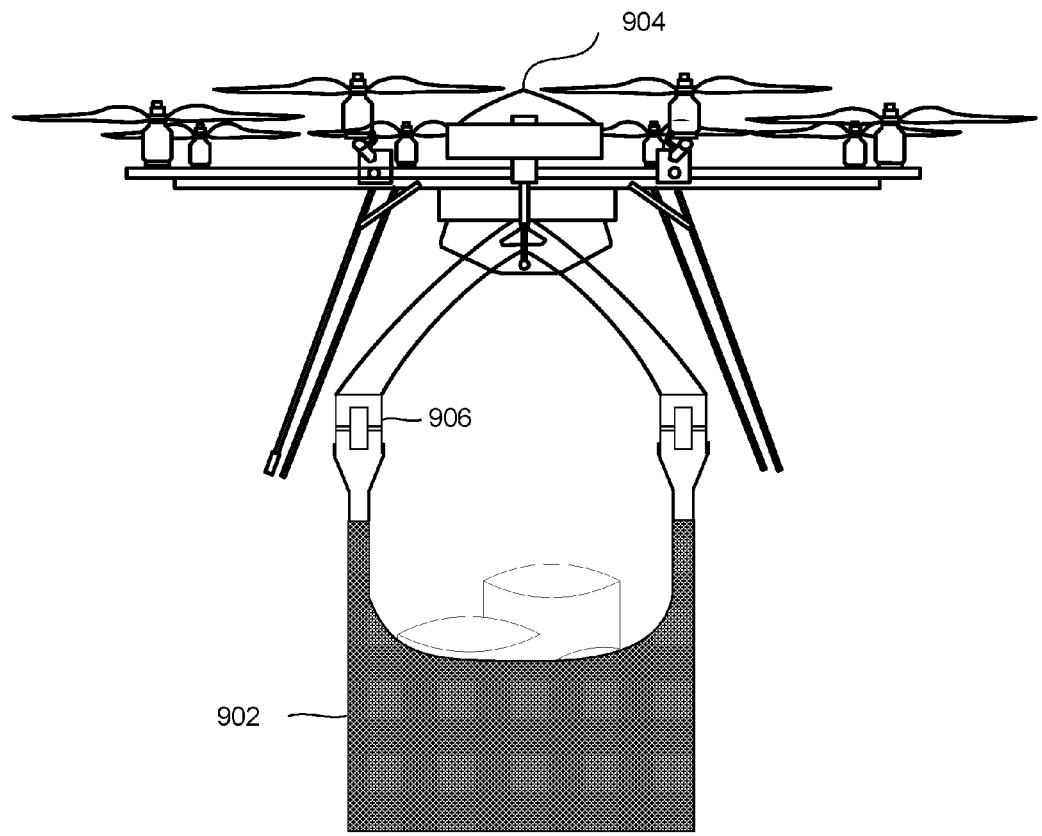
FIG. 9 illustrates an example fabric tote being transported by an unmanned aerial vehicle.

FIG. 9 illustrates an example fabric tote 902 being transported by an unmanned aerial vehicle (UAV) 904, such as via handles 906.

The UAV 904 may comprise a control management system configured to direct the UAV to fly to a designated delivery location (e.g., a customer delivery site, a different location in the inventory facility, a different inventory facility, etc.). In various examples, the UAV 904 may receive inputs from one or more inertial sensors (e.g., accelerometers, gyroscopes, magnetometers, etc.) and/or positioning sensors (e.g., global positioning sensors, ultrasonic sensors, radar systems, etc.). The inertial sensors may be configured to measure precise positioning data of the UAV 904 along three axes: heading, pitch and roll, and send the positioning data to the control management system. The control management system may use the positioning data to align the UAV 904 with a fabric tote 902 for pick-up.

As shown in FIG. 9, the UAV 904 may comprise one or more arms configured to connect to the handles 906 of the fabric tote 902. The coupling may comprise a magnetic connection, a mechanical connection, or other type of connection. In some examples, the UAV 904 may be configured to house the fabric tote 902 inside a storage compartment for transport.

In various examples, the UAV 904 may be configured to connect to the fabric tote 902 while the fabric tote 902 is in a neutral position, with the side portions of the fabric tote 902 substantially vertical. Additionally or alternatively, the UAV 904 may be configured to connect to the fabric tote 902 while in a closed position, as illustrated in FIG. 4.

Once connected, the UAV 904 may transport the fabric tote 902, and the contents thereof, within an inventory facility, to a different inventory facility, and/or to a location designated by a customer. For example, the fabric tote may be loaded with inventory items specified in a customer order. The UAV may then deliver the inventory items to the customer's location in the fabric tote.

Figure 10:
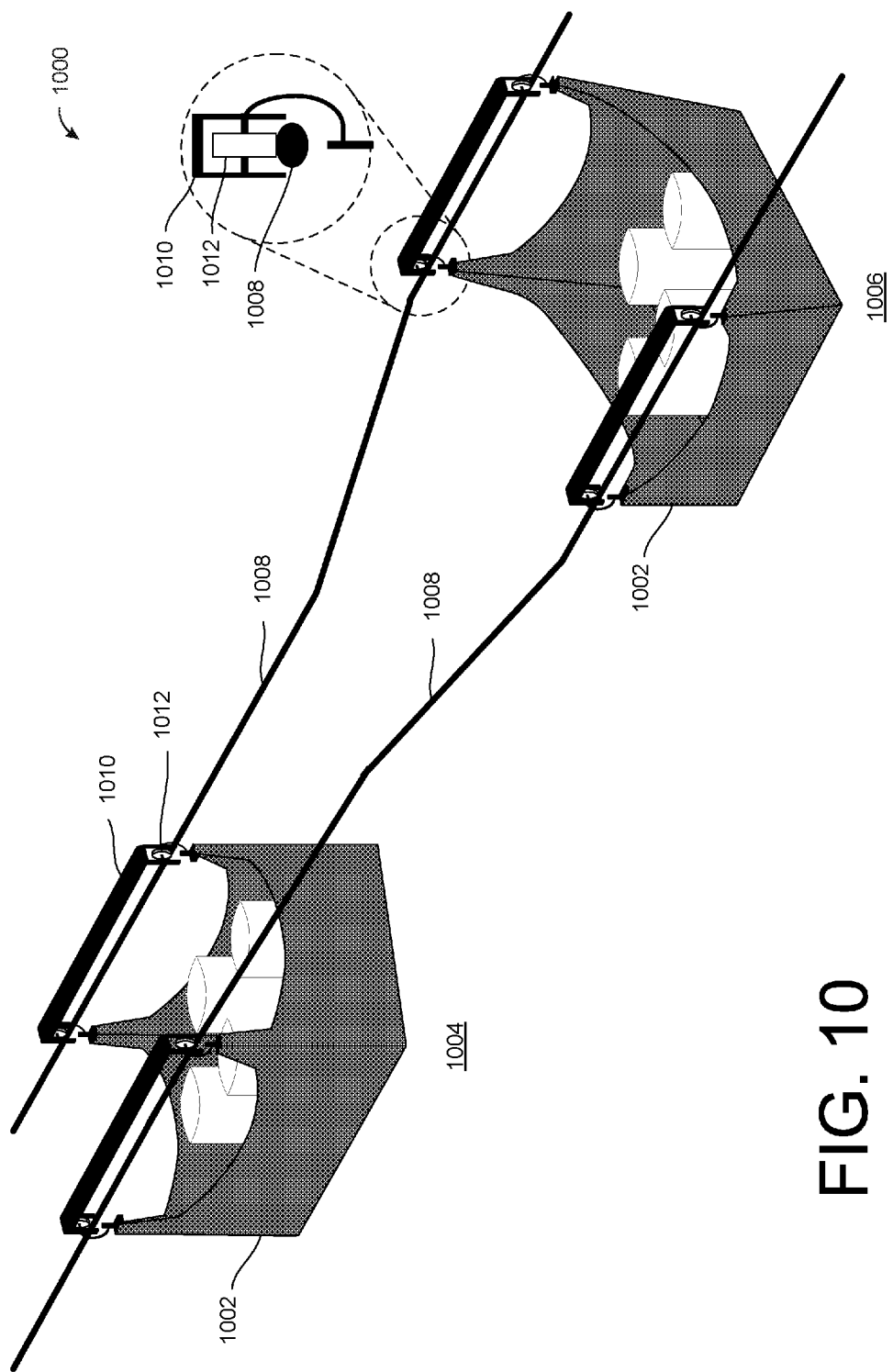
FIG. 10 illustrates a perspective view of an example conveyor-type system for transporting a fabric tote.

FIG. 10 illustrates a perspective view of an example conveyor system 1000 for transporting a fabric tote 1002. As depicted, the conveyor system 1000 includes two positions, a neutral position 1004, and an open position 1006. However, it is understood that the conveyor system may include other positions, such as a closed position, or any position in between the closed and the open positions.

In various examples, the conveyor system 1000 may include a belt, a single cable 1008, a pair of rails or cables, a single rail, or other conveyor-type system. As illustrated in FIG. 10, the conveyor system 1000 may include two cables 1008, on which the handles 1010 of the fabric tote 1002 may travel. In various examples, the cables 1008 of the conveyor system 1000 may be fixed, and the handles 101 may include two or more rollers 1012, such as rollers 312, to facilitate movement of the fabric tote 1002 along the cables 1008. The rollers 1012 may comprise a groove, a frictional material, or other material and/or machining process to increase the stability of the handle 1010 and the fabric tote 1002 on the cable 1008. Additionally or alternatively, the cables 1008 may include a frictional band configured to connect to the sides of the roller 1012 to increase friction between the cable 1008 and the roller 1012.

In various examples, the rollers 1012 may be powered, such as by an electric motor, to facilitate movement along the cables 1008 or rails. In some examples, the cables 1008 or rails of the conveyor system 1000 may be charged, and may provide power to drive the rollers 1012. In various examples, the cables 1008 or rails may be magnetically charged. In such examples, the fabric totes 1002 may levitate above and transit along the cables 1008 or rails of the conveyor system 1000 using magnetic levitation to create lift and propulsion.

In some examples, the conveyor system 1000 may be configured to operate via gravity, such that the fabric totes 1002 may slide or roll from a first location to a second, lower location. In various examples, the cables 1008 of the conveyor system 1000 may be driven by a mechanical system, such as a bullwheel or other pulley system, and may move about the facility, carrying the fabric totes 1002 between locations.

The conveyor system 1000 may be configured to partially and/or fully circumnavigate an inventory facility. Additionally or alternatively, the conveyor system 1000 may be configured from a workstation to another location in the inventory facility (e.g., an on-load/off-load location, an inventory pod or set of inventory pods, another workstation, or other location). In various embodiments, the conveyor system 1000 may be configured to transport fabric totes 1002 between different floors in a facility. For example, a conveyor system may be routed between a fourth story workstation and a first story workstation. In such an example, the fabric totes on the conveyor system may be configured to stop at any point on the conveyor system.

In various examples, the cables 1008 or rails may be configured at a set distance from one another. In the illustrative example, the cables 1008 or rails may be configured to diverge, such that the fabric tote 1002 transitions from the neutral position 1004 to the open position 1006. The cables 1008 or rails may be configured to diverge to the open position 1006 when approaching a workstation. In such examples, the handles 1010 of the fabric totes 1002 may be separated, thereby facilitating access to the contents of the fabric tote 1002.

In various examples, the workstation may include a robotic arm configured to retrieve particular inventory items from, store particular inventory items into, or otherwise manipulate or adjust inventory items in the fabric totes 1002. For example, the robotic arm may remove a designated inventory item from the fabric tote 1002 on the conveyor system 1000, and deliver it to the particular location, such as a workbench at the workstation. Additionally or alternatively, a human worker may extract, insert and/or manipulate the particular inventory items in the fabric tote 1002.

Figure 11:
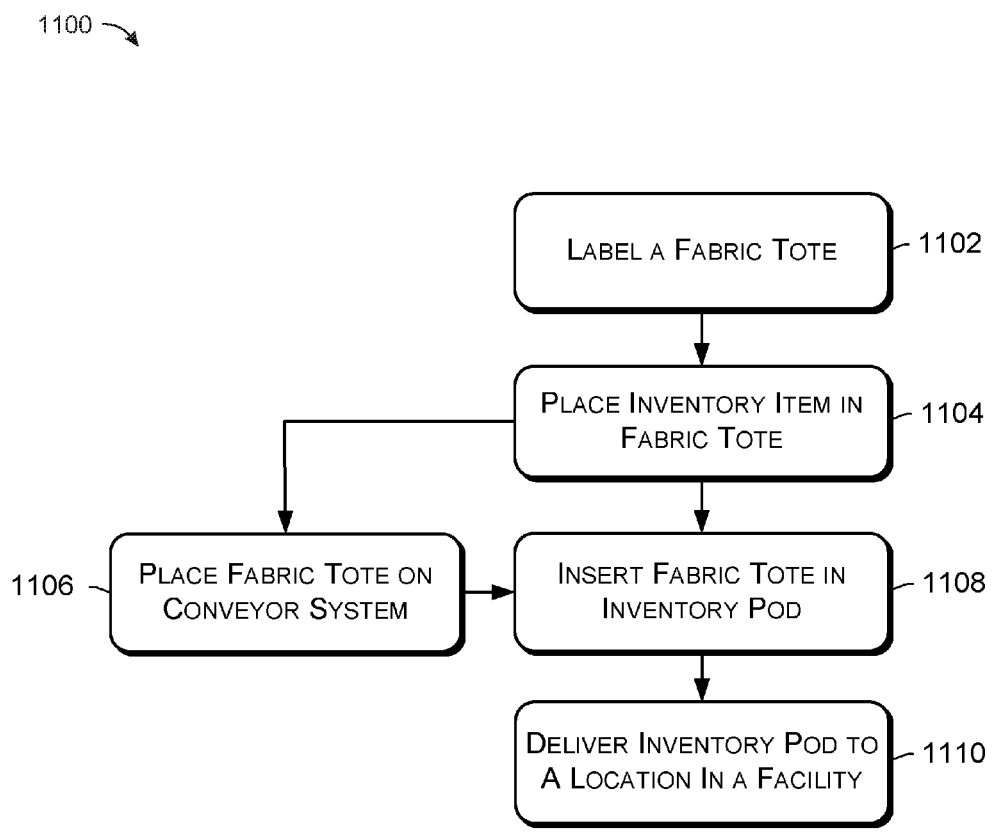
FIG. 11 illustrates a process for using a fabric tote in an inventory management and order fulfillment system.

FIG. 11 illustrates a process 1100 for using a fabric tote in an inventory management and order fulfillment system.

At 1102, a human worker and/or robotic arm may label a fabric tote. In various examples, the label may be a unique identifier and may be based on one or more inventory items to be stored in the fabric tote. In some examples, the label may be based on an inventory pod in which the fabric tote is stored. Additionally or alternatively, the label may be a virtual label that creates an association between a unique identifier of the fabric tote and one or more unique identifiers of the one or more inventory items to be stored in the fabric tote, e.g., via scanning or otherwise imaging the respective unique identifiers.

In various examples, the labeling may be directed by a management component, such as management component 122. In such examples, the management component may direct the human worker and/or robotic arm to place a label on fabric tote or program the system with a pre-existing label based at least in part on the one or more inventory items to be stored in the fabric tote. The programming may include scanning the pre-existing label, and programming the system to correlate the label with the one or more inventory items.

At 1104, a human worker and/or a robotic arm may place the one or more inventory items corresponding to the label in the fabric tote. In various examples, the fabric tote is first partially or fully removed from an inventory pod prior to placing the one or more inventory items in the fabric tote. The fabric tote may be placed in an open position prior to placing the one or more inventory items.

At 1106, the human worker and/or extractor robot may place the fabric tote on a conveyor system for delivery to a particular location. In such an example, upon reaching the particular location, a second human worker and/or extractor robot may remove the fabric tote from the conveyor.

At 1108, the human worker and/or an extractor robot may insert the fabric tote in the inventory pod. The inventory pod may be configured to house multiple fabric totes of the same and/or of varying sizes. The inventory pod may include a label corresponding to the multiple fabric totes and/or the inventory items located therein.

At 1110, a mobile drive unit may deliver the inventory pod to a location in the facility. The mobile drive unit may be configured to drive beneath the inventory pod, in between the legs of the inventory pod. The mobile drive unit may include a lift mechanism configured to couple to a base of the inventory pod, and lift the legs of the inventory pod off a surface of the floor. In various examples, the management component may direct the mobile drive unit to deliver the inventory pod to a location in the facility for storage or processing.

Figure 12:
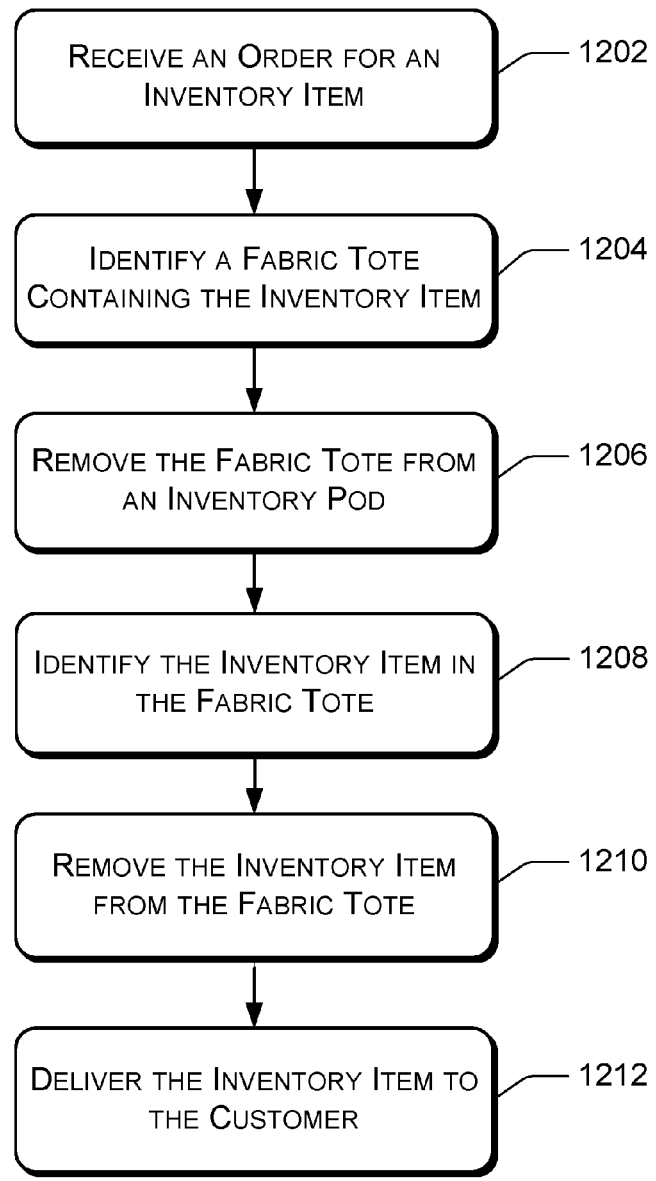
FIG. 12 illustrates a process for filling an order in an inventory management and order fulfillment system using fabric totes for storage.

FIG. 12 illustrates a process 1200 for filling an order in an inventory management and order fulfillment system using fabric totes for storage.

At 1202, the inventory management and order fulfillment system receives an order for an inventory item. In various examples, the order may be received by a management component, such as management component 122. In some other examples, the order may be received by a computing system, and transferred to the management component as necessary to fulfill the order.

At 1204, a fabric tote containing the inventory item is identified. In various examples, the management component may identify the fabric tote by a label on the fabric tote. The label may include information regarding the contents of the fabric tote. For example, the fabric tote may have a label indicating that the fabric tote contains a certain type of gift wrapping paper.

In some examples, the management component may first identify the inventory pod carrying the fabric tote, and/or may cause a mobile drive unit to locate and transport the identified inventory pod to a particular location, e.g., a workstation. After identifying the inventory pod, such as via a label, an extractor robot may identify the fabric tote containing the inventory item. The extractor robot may identify the fabric tote based on a label on the fabric tote, a color of the fabric tote, a size of the fabric tote, or other means of identification. In various examples, the extractor robot may include a scanner and/or camera for identifying the fabric tote. Alternatively, a human worker may identify the tote based in part on a visual inspection of the fabric tote.

At 1206, a human worker and/or an extractor robot may remove the identified fabric tote from the inventory pod. The fabric tote may be partially or fully removed from the inventory pod. The fabric tote may further be inserted into the conveyor system by the human worker and/or the extractor robot to be transported to another location or workstation for processing.

At 1208, the inventory item in the fabric tote is identified. The inventory item may be identified by a human worker and/or a robotic arm configured to identify and remove the inventory item. The human worker and/or the robotic arm may identify the inventory item based at least in part on a label associated with the inventory item. The robotic arm may include a scanner and/or a camera to assist in locating and identifying the inventory item in the fabric tote. In various examples, the robotic arm may be a coupled to a mobile drive unit and/or an extractor.

At 1210, the human worker and/or the robotic arm removes the inventory item from the fabric tote. The fabric tote may then be sent to the same or a different inventory pod via any combination of human workers, extractor robots, mobile drive units and/or the conveyor system to be transported to another location or workstation for storage or further processing.

At 1212, the inventory item is delivered to the location specified in the order at 1202. In various examples, the inventory item may be delivered individually. In some examples, the inventory item may be packaged with other inventory items for a delivery to the location.

In various examples, the inventory item may be placed in a different fabric tote, such as with other inventory items in the order, and delivered to the location. In such examples, the fabric tote with the ordered inventory items may be delivered by one of various transportation means, including but not limited to an unmanned aerial vehicle, a shipping truck or vehicle, a conveyor system, a delivery robot, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a tote configured to store an inventory item, the tote comprising a first handle and a second handle;
   an inventory pod comprising a storage space, wherein the storage space comprises a rail system configured to assist insertion of the tote into the storage space;
   a mechanical device comprising:
      a lifting mechanism configured to couple to a bottom of the inventory pod and to lift the inventory pod off a surface of an inventory facility in which the mechanical device is located; and
      a drive system to move the mechanical device from a first location in the inventory facility to a second location in the inventory facility;
   a conveyor system comprising a first cable and a second cable, and configured to transport the tote within the inventory facility;
   an extractor configured to couple to the first handle and the second handle and to cause a manipulation of the tote, wherein the manipulation of the tote comprises at least removing the tote from the storage space of the inventory pod and placing the first handle on the first cable and the second handle on the second cable, wherein the extractor is located at the second location and the conveyor system transports the tote from the second location to a third location in the inventory facility; and a mechanical arm at the third location, the mechanical arm configured to remove the inventory item from the tote and transport the inventory item to a fourth location in the inventory facility, wherein the fourth location comprises a work area for initiating a delivery of the inventory item.

2. The system as recited in claim 1, wherein the first cable and the second cable are configured to diverge from a first distance in which the tote is in a neutral position to a second distance in which the tote is in an open position to facilitate access to the inventory item at the third location in the inventory facility.

3. The system as recited in claim 1, further comprising a management component configured to:
 identify the tote;
 identify the inventory pod;
 assign a first task to the mechanical device, the first task comprising:
  driving to the first location, the first location being a storage location for the inventory pod;
  coupling to the bottom of the inventory pod;
  lifting the inventory pod off the surface of the inventory facility; and
  driving to the second location;
 assign a second task to the extractor, the second task comprising:
  removing the tote from the inventory pod; and
  placing the tote on the conveyor system; and
 assign a third task to the mechanical arm, the third task comprising:
  removing the inventory item from the tote; and
  transporting the inventory item to the fourth location.

4. The system as recited in claim 1, further comprising a management component configured to:
 determine a minimum battery charge of the mechanical device; and
 based at least partly on the minimum battery charge, assign a recharge task to the mechanical device, wherein the recharge task comprises connecting to a recharging station.

5. An inventory facility comprising:
 a tote comprising at least one handle and configured to store an inventory item;
 an inventory pod configured to store the tote via the at least one handle;
 an extractor configured to remove the tote from the inventory pod via the at least one handle; and
 a conveyor configured to deliver the tote to a workstation in the inventory facility via the at least one handle.

6. The inventory facility as recited in claim 5, wherein the extractor is further configured to:
 couple to a first handle of the tote and a second handle of the tote; and
 place the first handle on a first cable or a first rail of the conveyor and the second handle on a second cable or a second rail of the conveyor.

7. The inventory facility as recited in claim 5, wherein the extractor is further configured to adjust a first handle of the tote and a second handle of the tote from a first distance in which the tote is in a neutral position to a second distance in which the tote is in an open position, the second distance being greater than the first distance.

8. The inventory facility as recited in claim 5, wherein the extractor is configured to couple to the tote via a magnetic connection or a mechanical connection.

9. The inventory facility as recited in claim 5, further comprising a mechanical device comprising a drive system to move with the inventory facility, wherein the mechanical device further comprises a lifting mechanism configured to couple to the inventory pod and lift the inventory pod off of a surface of the inventory facility, the mechanical device being further configured to deliver the inventory pod from a first location in the inventory facility to a second location in the inventory facility.

10. The inventory facility as recited in claim 5, further comprising an unmanned aerial vehicle configured to transport, via the at least one handle, the tote from the workstation to a second location, the second location being associated with a customer or the inventory facility.

11. The inventory facility as recited in claim 5, further comprising a management component configured to:
 identify the inventory pod;
 identify the tote; and
 cause the extractor to remove the tote and place the tote on the conveyor.

12. The inventory facility as recited in claim 5, further comprising a mechanical arm configured to identify the inventory item in the tote and remove the inventory item from the tote.

13. The inventory facility as recited in claim 5, wherein the tote comprises:
 a first handle comprising a first set of rollers; and
 a second handle comprising a second set of rollers,
 wherein the first set of rollers and the second set of rollers facilitate movement of the tote along a first cable or a first rail of the conveyor and a second cable or a second rail of the conveyor.

14. The inventory facility as recited in claim 5, wherein the conveyor comprises a first cable or a first rail and a second cable or a second rail configured to diverge from a first distance in which the tote is in a neutral position to a second distance in which the tote is in an open position to facilitate access to the inventory item, wherein the second distance is greater than the first distance.

15. A method comprising:
 receiving, from a customer device, an order for an inventory item;
 identifying a tote comprising at least one handle and storing the inventory item;
 identifying a location associated with an inventory pod storing the tote;
 causing a mechanical device to move to the location associated with the inventory pod;
 causing the tote to be removed, via the at least one handle, from the inventory pod via an extractor coupled to the mechanical device;
 causing the tote to be delivered to a second location associated with a conveyor;
 causing the tote to be placed on the conveyor via the at least one handle;
 causing the tote to be delivered, via the at least one handle, to a workstation via the conveyor;
 causing the inventory item to be removed from the tote at the workstation; and
 causing a delivery of the inventory item to a customer associated with the customer device.

16. The method as recited in claim 15, further comprising:
causing a first handle of the tote to be placed on a first cable or a first rail of the conveyor; and
causing a second handle of the tote to be placed on a second cable or a second rail of the conveyor,
wherein the first handle is configured to facilitate movement of the tote along the first cable or the first rail and the second handle is configured to facilitate the movement of the tote along the second cable or the second rail.

17. The method as recited in claim 15, wherein the conveyor comprises a first cable or a first rail and a second cable or a second rail that are configured to diverge from a first distance in which the tote is in a neutral position, to a second distance in which the tote is in an open position, the open position to facilitate access to the inventory item.

18. The method as recited in claim 17, wherein the inventory item is removed by a mechanical arm at the workstation, the first cable or the first rail and the second cable or the second rail of conveyor configured to diverge to the second distance proximate to the workstation.

19. The method as recited in claim 15, wherein the tote comprises:
a first handle comprising first rollers configured to move along a first cable or a first rail of the conveyor;
a second handle comprising second rollers configured to move along a second cable or a second rail of the conveyor; and
one or more electric motors configured to drive the first rollers and the second rollers to facilitate movement of the tote along the conveyor.

20. The method as recited in claim 19, wherein at least one of the first cable, the first rail, the second cable, or the second rail of the conveyor is electrically charged and configured to transfer energy to the one or more electric motors of the tote.

* * * * *